May 4, 1965  R. E. T. LEHACQUE  3,181,322
MACHINE FOR SMOOTHING BAND-SAW BLADES
Filed March 13, 1961  4 Sheets-Sheet 1
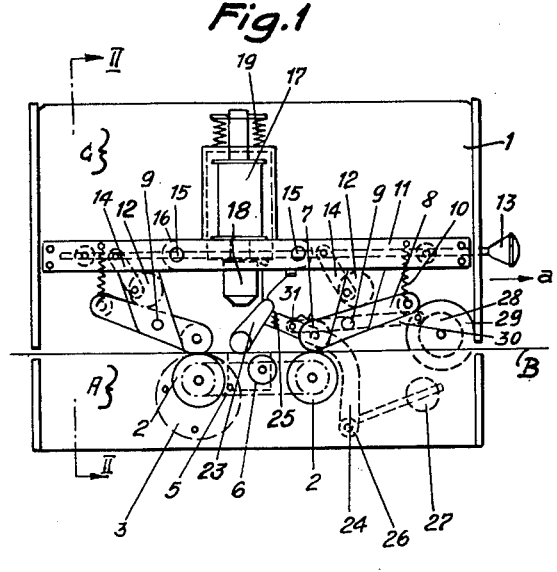
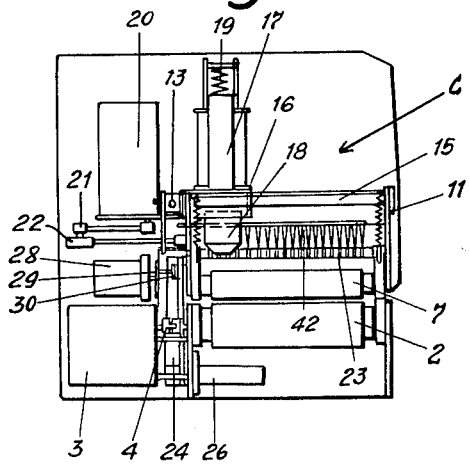
INVENTOR
Raymond E. T. Lehacque
BY Lowry & Rinehart
ATTORNEYS May 4, 1965   R. E. T. LEHACQUE   3,181,322
MACHINE FOR SMOOTHING BAND-SAW BLADES
Filed March 13, 1961   4 Sheets-Sheet 2
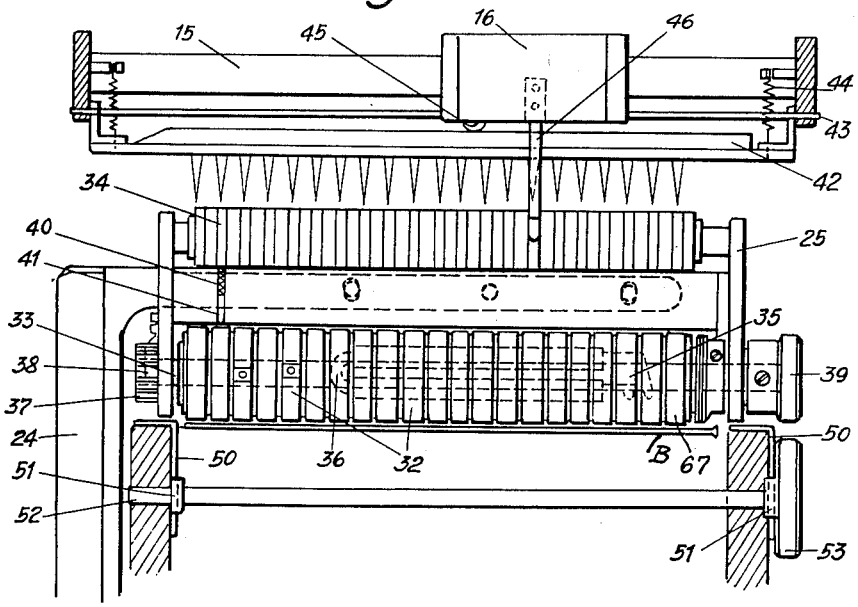
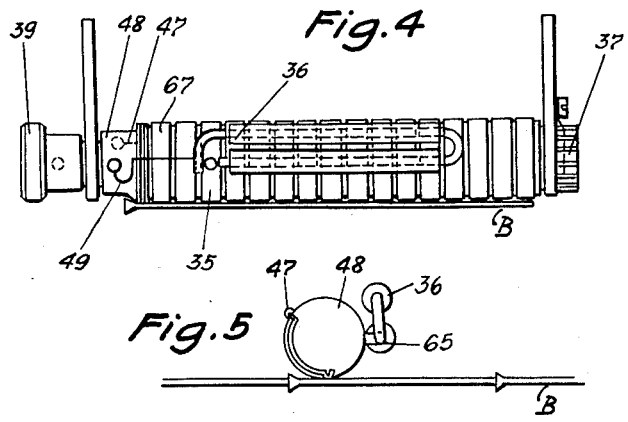
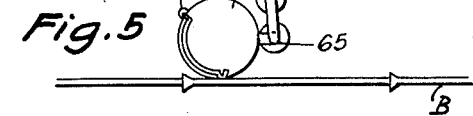
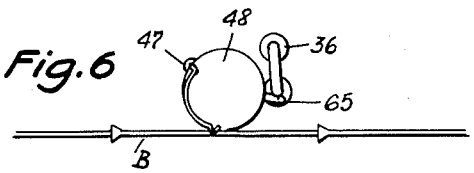
INVENTOR
Raymond E. T. Lehacque
BY
ATTORNEYS May 4, 1965 R. E. T. LEHACQUE 3,181,322
MACHINE FOR SMOOTHING BAND-SAW BLADES
Filed March 13, 1961 4 Sheets-Sheet 4
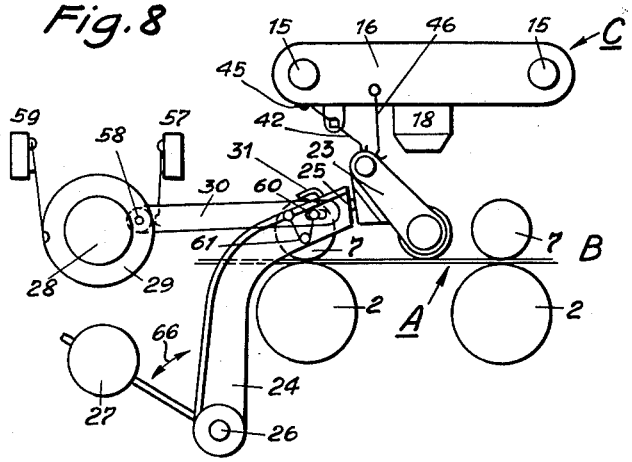
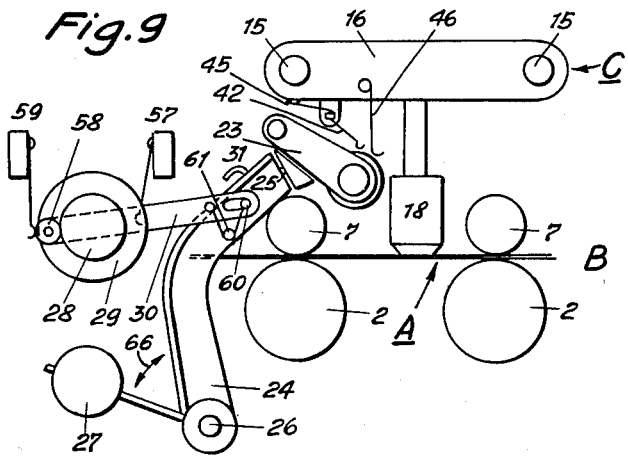
INVENTOR
Raymond E. T. Lehacque
BY Lowry & Rinehart
ATTORNEYS

United States Patent Office 3,181,322
Patented May 4, 1965

3,181,322
MACHINE FOR SMOOTHING BAND-SAW BLADES
Raymond Egide Theodore Lebacque, Mons-en-Laonnois, Aisne, France, assignor to Iseli & Co., Schotz, Lucerne, Switzerland
Filed Mar. 13, 1961, Ser. No. 108,219
6 Claims. (Cl. 72—17)

My present invention relates to improvements in band-saw blade smoothing or undenting machines with the object of rendering such leveling or undenting operations automatic and performing same quickly and reliably.

To such end, the machine disclosed herein comprises means for feeding the blade longitudinally, means for driving a hammer sled transversely of the blade when a fault is sensed, and a hammer having preferably an electro-magnetic drive, said means and hammer being controlled by a follower head.

Subject matter of the invention also are embodiments which have at least one of the following features:

(1) Blade feed is accomplished by a set of driving rolls engaging, preferably by spring means, the two blade sides to drive the blade and which may be stopped as desired.

(2) When the blade driving rolls are separated, the follower head is disengaged from the blade.

(3) The follower head comprises at least one collector having a coaxial assembly of annular contact discs which are electrically insulated from each other and all of which have on their circumferences a rise or swell (all of the latter being arranged to form a helix) and which contact the saw blade. Said contact discs are for the purpose of finding faults such as dents, jags or other uneven spots, and are brought into contact with an articulated brass comb and with a sliding contact disposed on the hammer-sled in the axis of the hammer path to help locate the faults. Said discs may serve either as supports (in the case of cross-smoothing when the follower head lies on the blade by means of two supporting contacts) or for tracking and locating the faults. The use of said discs is determined by a single control which permits, by turning the collector, to space the supporting contacts in accordance with the saw-blade width or to retract them again (in the case of lengthwise smoothing.)

(4) When smoothing up to the tooth-crests, an automatic actuation ensures that during the tracing of this zone the propping contact situated in vicinity of the tooth-root is withdrawn.

(5) For smoothing lengthwise dented or jagged blades, the assembly comprises adjusting means with two cams which support the follower-head ends.

(6) A safety device is provided to prevent the motor, which produces the hammer crosstravel across the blade, from being restarted before the follower head lies on the blade.

(7) In order to attain an optimum smoothing action, the striking power of the electro-magnetic hammer may be regulated by resistance in the electromagnet circuit.

One form of the invention is shown, by way of example, in the drawings, in which:

FIG. 1 is a frontview of the mechanism of a smoothing machine according to the invention.

FIG. 2 is a view taken on the line II—II of FIG. 1.

FIG. 3 shows the follower head and associated parts in elevation, in a much larger scale than in FIGS. 1 and 2, FIGS. 4 to 6 illustrate the attachement for smoothing up to the tooth crests, FIGS. 8 and 9 are rear views of the follower-head retracting attachment.

Figure 7:
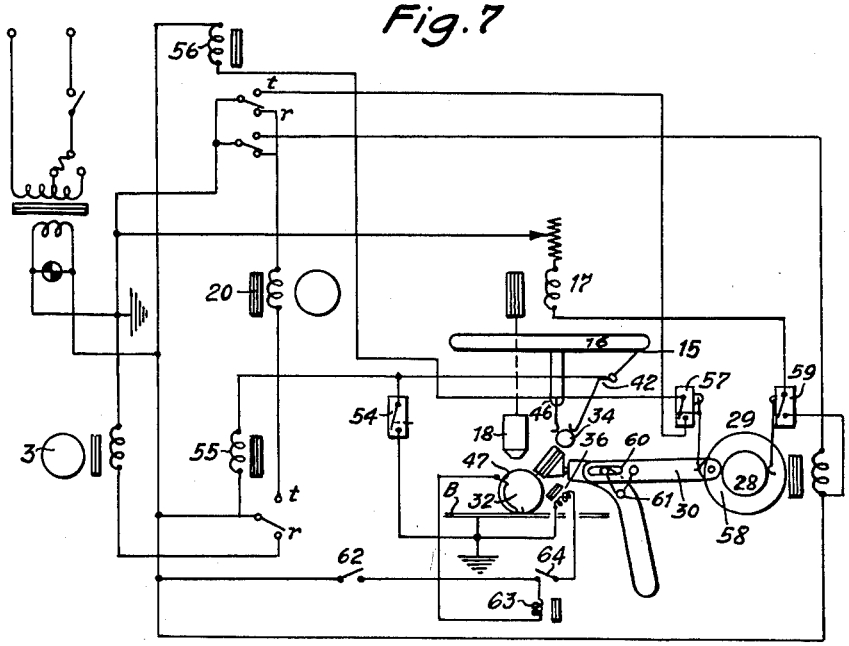
FIG. 7 is an electrical wiring scheme pertaining to the machine.

First, FIGS. 1 and 2 depict the assembly of the mechanism of the smoothing machine which comprises three main portions, namely an attachment A for feeding the blade B and accessories, C a hammer sled and accessories, and a follower head with accessories.

Numeral 1 denotes the frame on which are mounted rolls 2 which, by means of a reduction drive and a motor 3 having a brake, are driven via a clutch 4 and a drive 5. Between the rolls 2 an anvil 6 is disposed. Rolls 7 are pressed against the saw blade by arms 8 which are pivoted at 9 on frame 1 and which are biased by springs 10 so that the rolls 7 are against the blade. The rolls 7 are lifted away from the blade by the turning of cams 12 when a bar 13 is shifted in the direction $a$, whereby crankarms 14 also are moved in the direction $a$. A sled 16 that carries the electro-magnetic hammer 17, moves on two axles 15 which interconnect two joists 11. Hammer 18 is returned to the topmost position of its striking path by the action of springs 19. Said sled is connected to the crossfeed motor 20, which includes a brake, by means of rods 21 and 22 which are connected together to form a crank.

The follower head 23 at 25 is articulated to a lever 24 which is connected to a counterweight 27. Lever 24 is pivoted at 26, as shown by the arrow 66, and driven by a motor 28 (with brake) through a disc 29 and a crank-rod 30.

To prevent head 23 from being damaged when the blade is inserted into the machine, the lifting attachment of the upper rolls 7 also has to lift the head 23. To such end, lever 24 comprises a stop 31 which engages arm 8.

As shown in FIG. 3, head 23 comprises two electrical collectors 32 and 34. Head 23 could comprise only one collector, provided that the rises or swells of the above-mentioned contact discs would consist of a very hard and unbreakable insulating material. Each of said collectors 32 and 34 is an assembly of annular discs which are electrically insulated from each other and are fixed to an axle, with the exception of disc 35 that is free to rotate and is actuated by electromagnets 36 and a spring 49. The main collector 32 which rests on the blade on the noses to freely rotatable disc 35 and a disc at the other edge of the blade B, is made of a hard material to be wear-resistant, and the other collector 34 is made of copper and is contacted by a sliding contact 46 and an electrically conductive comb 42. Each main collector disc may be electrically connected to the corresponding disc of the other collector through a dog, for example that shown at 41, and a spring, such as that shown at 40 (only one of each being shown in FIG. 3), with the exception of the first disc 67 which is situated at the outermost edge of the toothed portion of the blade B. On the ends of axle 33 are mounted a ratchet wheel 37 with pawl 38 and a setting knob 39 that serves for turning and regulating the main collector 32. Since the rises or swells of the discs are so arranged that they form a helix about the axle 33, the disc whose swell touches the blade at any time can be controlled merely by rotating the knob 39 and the axle 33 with the discs mounted thereon. Each disc swell position corresponds to a division on knob 39, for which the respective disc is in supporting position. In such position, the disc rests on the saw blade through a rise of 0.05 to 0.1 millimeter and is provided with a plate of insulating material opposite dog 41. As mentioned above, the knob 39 is rotated until a rise or swell touches the edge of the blade B farthest from the blade teeth. The collector 32 is then supported on the blade B on this swell and on the rise of disc 35. Comb 42 which serves for tracking faults, is pivotably mounted at 43 and may bear on the secondary collector 34 through the action of a spring 44. A nose 45 provided on hammer sled 16 clears the comb. The secondary collector 34 is contacted by a slide finger 46 that also is mounted on hammer sled 16 in the axis of the path of hammer 18.

FIGS. 4 to 6 show an electromagnet 36 which is fixed to head 23 and causes the rotation of the disc 35 from the supporting position to the finding position through nose 65 as soon as a contact piece 47 secured to a separate holder 48 closes the circuit of magnet 36 (see FIG. 7) upon passage of a saw-blade tooth. Since contact piece 47 projects into the space between the two sawblade teeth, it closes the circuit of magnet 36 when it touches a tooth of the blade B, which is grounded, by closing the circuit to the relay coil 63 which closes the contacts 64 to connect the coil 36 across the source of energy. A spring 49 resets the disc through nose 65 into supporting position. This system has the advantage of ensuring the tracing of the blade across its entire width up to the tooth crests by supporting the collector 32 on a blade tooth, whenever a tooth is available.

For the purpose of smoothing the sawblade lengthwise, two holders 50 are provided (FIG. 3) that are actuated by cams 51 secured to an axle 52, and a regulating knob 53 which adjusts the lowering of head 23 in relation to the blade, parallel to anvil 6.

FIG. 7 shows the electrical wiring scheme of the machine. For safety reasons, the machine is fed exclusively at lo-tension of 24 volts via a transformer of 110–220 volts.

When smoothing in the transverse direction, the machine operates as follows:

The rolls 7 are raised by moving the bar 13, thereby rotating the cams 12 to counteract the action of the springs 10. The blade to be straightened is then inserted and the bar 13 is moved to lower the rolls 7 so that the blade is firmly held between the rolls 7 and the rolls 2. The knob 39 is then rotated until the appropriate discs 32 have their rises contacting the blade, and feed motor 3 is started by closing the power switch, not labelled in FIG. 7. If no faults are sensed when the hammer sled is at rest, microswitch 54 in FIG. 7 is open, the comb 42 contacts the discs of the collector 34, and the contactor of the relay 55 (FIG. 7) is in position r.

The feed motor 3 drives the blade through the machine, and when a fault appears, it is detected by the main collector 32 of head 23 closing the circuit on the coil of relay 55 that moves to position t. The collector 32 is supported on the blade B by the rises on the disc 35 and a disc at the other edge of the blade. The insulated portion of these two discs are aligned with their respective dogs 47. However, whenever a bump or dent in the blade B appears under the collector 32, it makes contact with the disc adjacent it, completing a circuit from ground, through the blade B, the disc of collector 32, the dog 47 adjacent that disc, the collector 34, the comb 42, and the coil of relay 55 to the source. Feed motor 3 thereby is stopped, cross-feed motor 20 is started, and contactor 56 is in its rest position r. Out of its position of rest, the hammer sled being driven by motor 20, closes switch 54 and raises comb 42 free from secondary collector 34 by nose 45, which bears on the combs 42 to rotate the comb about the pivot 43 against the action of springs 44 (X). Slide contact piece 46, which is secured to the hammer sled that is moved by motor 20, moves across the discs of the collector 32 and closes the coil circuit from contactor 56 through the first disc of the main collector which is in contact with the located fault. The fault in the blade constitutes a bulge which contacts one of the discs of the collector 32 to form a complete circuit therewith. Contactor 56 thus arrives in position t, the motor 20 is stopped, motor 28 is started and lifts head 23 by means of disc 29 and crankrod 30 as shown by the arrow 66 in FIGS. 7 and 8. As soon as it initiates the withdrawing movement, head 23 closes switch 57 by turning a cam 58 to thus close the circuit to the relay 56 even though slide contact 46 no longer is in contact with secondary collector 34. When head 23 has been raised entirely, rotating cam 58 for a short period of time closes a switch 59, to energize electromagnet 17 of hammer 18 to drive the hammer downward against the fault in the blade B. The hammer 18, when the switch 59 is opened, is returned into its position of rest through the action of springs 19. Head 23 then initiates its downward movement to be again supported on the sawblade before cam 58 opens switch 57, to avoid a premature start of crossfeed motor 20. To such end, rod 30 has an elongated slot in which is engaged a hinge 60 by the force of a spring 61 to form a lost motion device.

If a fault remains, the operation beginning from point X of the above description is repeated. When the fault has been eliminated, crossfeed motor 20 starts again with switch 57 open and with contactor 56 in position r. When slide contact piece 46 of hammer sled 16, which latter is driven by motor 20, locates a fault in its to-and-fro' movement, the operation is restarted from point X of the above description.

The mode of operation for the process of lengthwise smoothing are the same, provided that knob 53 has been set to support the head on the support 50, and knob 39 has been brought to a special position in which all of the main collector discs are brought into tracking position; disc 35 is moved into the same position upon actuation of a switch 62.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. A machine for smoothing metal bands, having as irregularities therein buckles, dents and the like, said machine comprising a bed, means for supporting a band to be smoothed on said bed, a movable hammer mounted above said bed for movement over the width of said band, means for detecting irregularitis in said band, first means responsive to the detection of an irregularity for causing said hammer to move across the width of said band, and second means responsive to he detection of irregularities for actuating said hammer when said hammer is positioned over an irregularity to cause said hammer to strike said irregularity and thus remove it.

2. A machine for removing dents and the like from metal bands, said machine comprising a bed for supporting a metal band to be smoothed, a bridge supported by said bed and carrying a hammer, said bridge extending transverse of the band, said hammer being movable from one end of said bridge to the other, an electrical feeler situated transverse of said band for detecting the position of any dents therein, means for feeding said band longitudinally on said bed, means responsive to the detection of a dent by said feeler to stop said feeding means for said band and to initiate movement of said hammer across said bridge, and means responsive to the positioning of said hammer over a dent to temporarily stop said hammer movement and to cause said hammer to strike the band to remove the dent, the movement of said hammer continuing after each hammer stroke until the entire width of the band is traversed thereby.

3. The machine defined in claim 2 wherein said feeler comprises a plurality of individual feelers insulated from each other and arranged in a row across the width of said band, each of said feelers comprising a switch contact in an electrical circuit, the band comprising the other contact of said switch, said feelers being spaced from said band by a small distance.

4. The machine defined in claim 3 wherein each of said feelers comprises a conductive disc having a raised portion thereon, said discs being mounted upon a common shaft and being fixed thereto, the raised portions of adjacent discs being rotatively displaced from each other to form a helix, and means for rotating said shaft to position the raised portion of any selected disc against said band.

5. The machine defined in claim 4 further comprising a second series of separate individual electrical brushes, each of said brushes being in electrical contact with one of said discs, each of said discs having an electrical insulating material mounted over a small portion of its surface which is in contact with the brush when the raised portion of the disc is in contact with the band to thus provide a means for supporting the series of discs on said band by means of individual discs without completing the circuit between the supporting discs and their brushes.

6. The machine defined in claim 5 wherein said hammer is electrically operated and is mounted on a carriage movable on said bridge, and further including electrical means for moving said carriage, said carriage comprising a single electrical brush and a nose, said nose causing the series of brushes to move out of contact with said discs when said carriage moves, the movement of said carriage causing said single brush mounted thereon to sequentially contact individual discs whereby an electrical circuit is established between said individual brush and a dent on said band to cause said hammer to be actuated at that point.

References Cited by the Examiner
UNITED STATES PATENTS
1,361,528  12/20  Maine _____ 153—39
FOREIGN PATENTS
406,733  11/24  Germany.

CHARLES W. LANHAM, *Primary Examiner.*

WHITMORE A. MILTZ, WILLIAM J. STEPHENSON,
*Examiners.*